US006189783B1

(12) United States Patent
Motomiya et al.

(10) Patent No.: US 6,189,783 B1
(45) Date of Patent: Feb. 20, 2001

(54) SYSTEM FOR AIDING IN USE OF A FACILITY ARRANGED TO EQUIP VISITORS WITH PORTABLE INFORMATION STORING UNITS, METHOD FOR AIDING IN USE OF A FACILITY, AND RECORDING MEDIUM FOR RECORDING THE METHOD

(75) Inventors: Yukie Motomiya, Kokubunji (JP); Hiroki Kitagawa, Foster City, CA (US); Jun Furuya, Hachioji; Tsutomu Hatakeyama, Tachikawa, both of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/196,234

(22) Filed: Nov. 20, 1998

(30) Foreign Application Priority Data

Nov. 20, 1997 (JP) .................................................. 9-319589

(51) Int. Cl.[7] ...................................................... G06F 17/00
(52) U.S. Cl. .......................... 235/375; 235/381; 701/209
(58) Field of Search .................................... 235/360, 381, 235/375, 382, 382.5; 701/209, 202

(56) References Cited

U.S. PATENT DOCUMENTS

| | | | | |
|---|---|---|---|---|
| 4,626,836 | * | 12/1986 | Curtis et al. | 340/706 |
| 5,287,269 | | 2/1994 | Dorrough et al. . | |
| 5,465,082 | * | 11/1995 | Chaco | 340/825.34 |
| 5,493,692 | * | 2/1996 | Theimer et al. | 455/26.1 |
| 5,689,229 | * | 11/1997 | Chaco | 340/286.07 |
| 5,774,827 | * | 6/1998 | Smith, Jr. et al. | 701/209 |
| 6,009,333 | * | 12/1999 | Chaco | 455/456 |

FOREIGN PATENT DOCUMENTS

| | | |
|---|---|---|
| 10063192 | 8/1994 | (BE) . |
| 2612669 | 9/1988 | (FR) . |
| 2228123 | 8/1990 | (GB) . |
| 2243705 | 11/1991 | (GB) . |
| 8-110923 | 4/1996 | (JP) . |
| 8-235395 | 9/1996 | (JP) . |

* cited by examiner

*Primary Examiner*—Thien M. Le
(74) *Attorney, Agent, or Firm*—Antonelli, Terry, Stout & Kraus, LLP

(57) ABSTRACT

A system and a method for aiding in the use of a facility arranged to equip each visitor with a portable information storing unit is provided for registering several visitors as a group in the portable information storing unit such as an IC card. One visitor holding the portable information storing unit can grasp how another visitor of the group is moving about the facility and exchange a message with another visitor. Further, the facility provides access terminals for the portable information storing unit, on which the visitable unit facilities, the visiting history of each visitor, and a waiting time of each unit facility are displayed.

19 Claims, 15 Drawing Sheets

SC15 CHECK FOR CHOSEN TICKET AND BUYING

SC16 CHECK FOR GROUP REGISTERATION IN BUYING TICKETS

SYSTEM FOR AIDING IN USE OF A FACILITY ARRANGED TO EQUIP VISITORS WITH PORTABLE INFORMATION STORING UNITS, METHOD FOR AIDING IN USE OF A FACILITY, AND RECORDING MEDIUM FOR RECORDING THE METHOD

BACKGROUND OF THE INVENTION

The present invention relates to a system and a method for aiding in the use of a facility arranged to equip visitors with portable information storing units. More particularly, the invention relates to the system and the method for aiding in the use of a facility which are used for supporting the users' comfortable enjoyment of various attractions (or unit facilities) held in a facility such as a theme park.

With recent progress of electronic component and semiconductor technologies, an IC card and a magnetic card have been developed. Those cards are currently used in various human daily activities. They have some advantages such as portability and possible substitute for cash.

Particularly in a theme park currently in fashion, the visitors normally have the desire to airily go therearound. Further, likewise, those who run the theme park would like to improve the quality of their theme park, so that they have been likely to positively go about a system for using those cards consistently in the theme park for several purposes such as fare adjustments.

The main use of a portable card in for example theme park is to automatically adjust the fare and automatically authenticating if a person is qualified for entering into attraction facilities such as special vehicles in the theme park.

If several persons enter as a group into a facility such as a theme park, the group may be often divided into subgroups or individuals, because they have their own concerns or each person would like to go around the facility with his or her favorite person(s). In this case, the group of persons may make a previous arrangement about a waiting place and time. Then, they will meet at the arranged place and time. However, as a disadvantageous point, between when they are separated from each other and when they meet at the waiting place, one of them may not be aware of the time, location and progress of the other persons around the facility, thereby causing some of the group to have to wait for the other persons for a considerably long time. Further, if a person is strayed from the group or the subgroup, it is quite difficult for him or her to meet the other members because the facility is large and very crowded.

Moreover, when the visitors become involved in an attraction such as a special vehicle, they usually review the contents of a pamphlet given in when buying tickets or a bulletin board in the facility so as to select their own favorite attractions. In this case, they may not be aware of the features of each attraction and how long they have to wait, so that their selection of the attractions may be somewhat risky.

Further, the visitors may often have a desire to know all the attraction facilities they have entered today. For such a desire, disadvantageously, the users of the conventional portable card do not have any means for making sure of the attraction facilities they have visited in a day.

As described above, the way of use of the conventional portable card in the theme park has been typically conventionally focused onto fare adjustment or check for facilities. It lacks the feature of providing effective information to the visitors and the comfortable use of the visitors.

SUMMARY OF THE INVENTION

It is an object of the present invention to provide a system and a method for aiding in the use of a facility which are arranged to provide a user with information according to a user's action through his or her portable card for generally aiding in the use of the facility so that the users may enjoy the facility in a more comfortable environment.

In carrying out the object, according to the invention, a group is registered in a portable information storing unit such as an IC card so that a person holding the portable information storing unit can grasp how the other persons of the same group move around the facility. The IC card also allows a person of the group to exchange a message with the other persons through each of access terminals located in the recreational facility. Further, the access terminal is enabled to display available facilities, a history of actual entrances into the attraction facilities, and an actual waiting time for each attraction facility.

DESCRIPTION OF THE PREFERRED EMBODIMENTS

Later, an embodiment of the invention will be described with reference to FIGS. 1 to 22.

Figure 1:
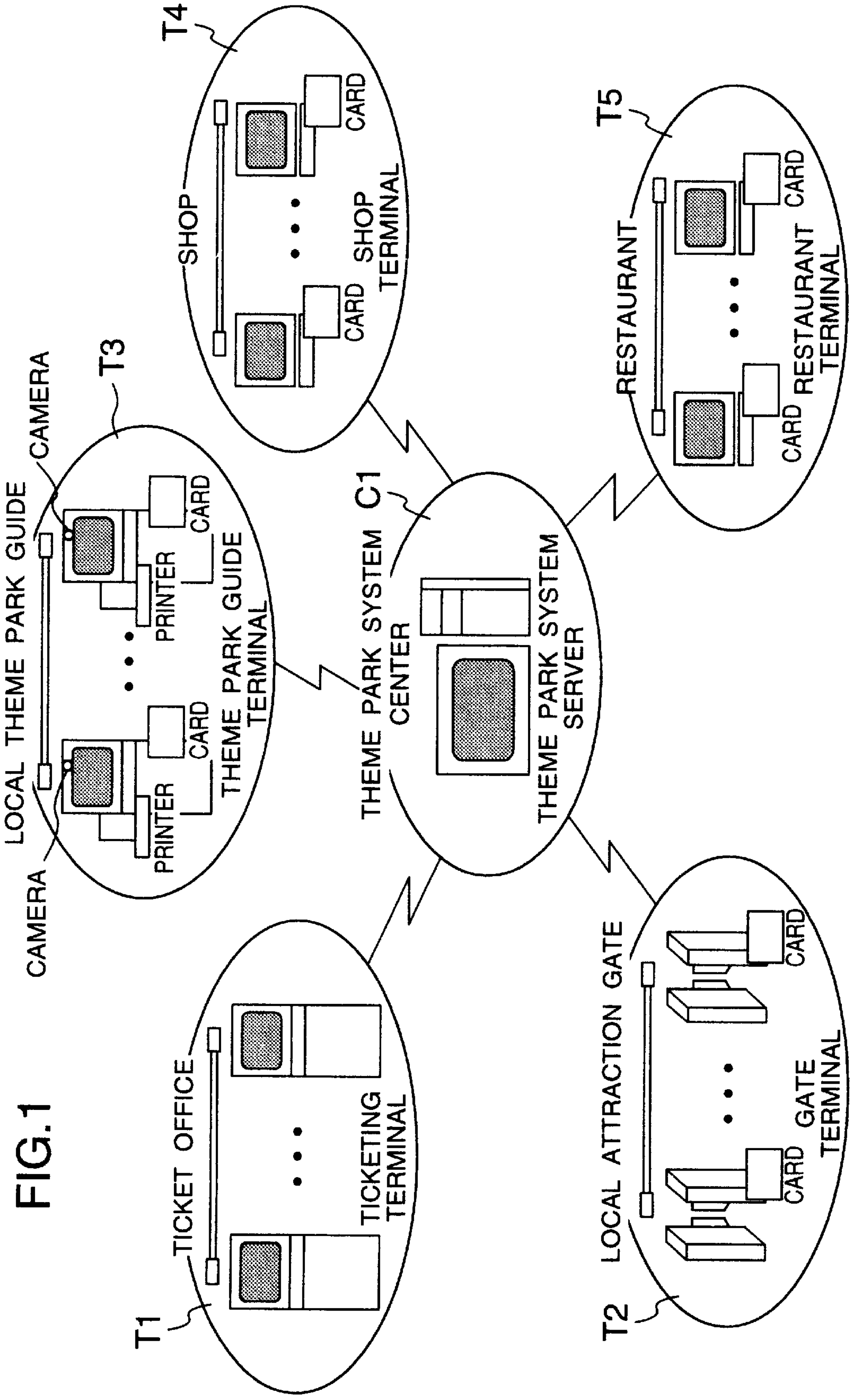
FIG. 1 is a system diagram showing a system for aiding in the use of a facility arranged to equip each visitor with a portable information storing unit according to the present invention.
Figure 22:
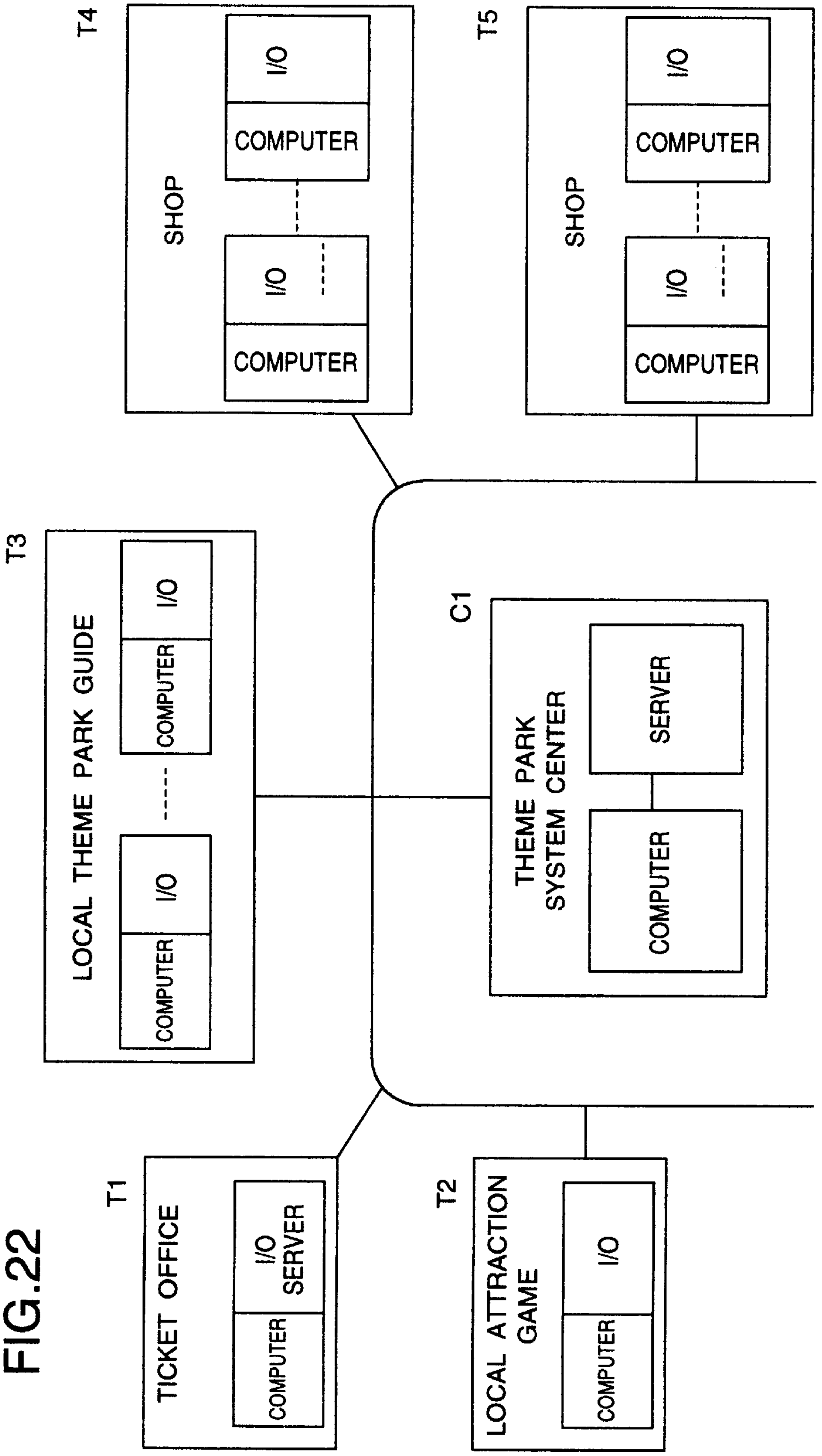
FIG. 22 is a diagram showing a more concrete hardware of a system for aiding in the use of a facility arranged to equip each visitor with a portable information storing unit according to an embodiment of the invention.

System Arrangement of System for Aiding in the Use of a Facility Arranged to Equip Visitors with Portable Information Storing Units At first, the description will be oriented to a system arrangement of a system for aiding in the use of a facility arranged to equip a visitor with a portable information storing unit according to the present invention with reference to FIGS. 1 and 22.

FIG. 1 shows a system arrangement of a system for aiding in the use of a facility arranged to equip a visitor with a portable information storing unit according to an embodiment of the present invention.

FIG. 22 shows a more concrete hardware arrangement of the system for aiding in the use of a facility arranged to equip a visitor with a portable information storing unit according to the embodiment of the present invention.

The system arrangement of this embodiment is intended to allow a visitor to comfortably and cheerfully enjoy a facility such as a theme park by using a small portable information storing unit such as an IC card or a magnetic card.

The portable information storing unit is effective mainly for storing information through a magnetic or an optical means, though no recording method is specified to the storing unit. Moreover, since it is held with each visitor when he or she goes around the facility, the portable information storing unit should be conveniently small enough to be held in walking.

According to this embodiment, the portable information storing unit may take the form of a wrist band to be worn around the wrist, an ordinary card to be put into a purse or a card holder, a neckless to be worn around the neck, or a name card.

The present embodiment will be described with an example of when it is used in the theme park. In place, it may be used in any other facility such as an amusement park, a skifield, a museum, and the like. Since, herein, the description will be expanded with an example of the theme park, the portable information storing unit of the invention is referred to as a "park card". In actual, however, the using field of the portable information storing unit is not limited to the park. It is just a term used herein.

In the description, the theme park corresponding to the facility is arranged to include attractions (often referred to as attraction facilities as well) as unit facilities. Each visitor enters into the recreational facility and then selectively into their attractions.

Further, in the following description of this embodiment, this part card is used up at one visit of each person. In actual, as will be described below, this park card may be provided with a function of a visiting history of the attraction facilities in the theme park. Hence, it may be valid in a long term such as half a year or one year or may be used as a subscripting ticket. These long-term ticket or subscripting ticket may make more effective use of the history function.

The park card, which is the portable information storing unit according to the embodiment of the invention, is offered as an electronic ticket by which the persons can visit the facility. Ordinarily, it is bought in a ticket office T1. Of course, it may be bought in a ticket agency.

When a person enters or leaves a facility through a local attraction gate T2, this card is automatically charged. The way of charge depends on the type of the park card. For example, with a one-day free pass ticket, a person can visit all the attraction facilities in the theme park, so that he or she can freely pass into all the facility gates. Moreover, this park card is served as a ticket as well as enables a theme park guide terminal located in many guide spots T3 in the park to give a theme park guidance to the user. In addition, the park card is also served as enabling the owner to exchange a message with his or her group member if the group members are separated in the theme park.

The park card may be provided with a function of settling up a bill when the user buys something at a shop T4 or takes a meal at a restaurant T5. This function conveniently allows the user to go around the theme park without having cash or taking cash out of the purse. When the user passes through a final gate of the theme park, the park card displays the overall charge so that the user can settle up it.

For managing the information of the system, a theme park system server is located in a theme park system center C1. The theme part system server can communicate with the terminals scattered in the theme park so that it may give an instruction to the terminal. The server is connected with the terminals scattered in the theme park through communications lines as indicated in FIG. 1.

In turn, the description will be oriented to a more concrete hardware arrangement of the system with reference to FIG. 22.

As described above, the theme part system center C1 is configured of a main computer connected with a server. This server records various kinds of necessary data as files. The main computer is connected to I/O units and computers each provided with a sever through the communications lines, the I/O units and the computers being installed in the insides of the ticket office T1, a local attraction gate T2, lots of local theme park guides T3, lots of shops T4, and lots of restaurants. In this hardware system, the computer of the theme park system C1 is connected to the computers located in T1 to T5 so that those computers are served as terminals for the computer of C1 in a time-sharing manner. The overall system implements the function of the system for aiding in the use of a facility arranged to equip each visitor with the portable information storing unit (to be discussed below).

Theme Park Guide Terminal

Figure 2:
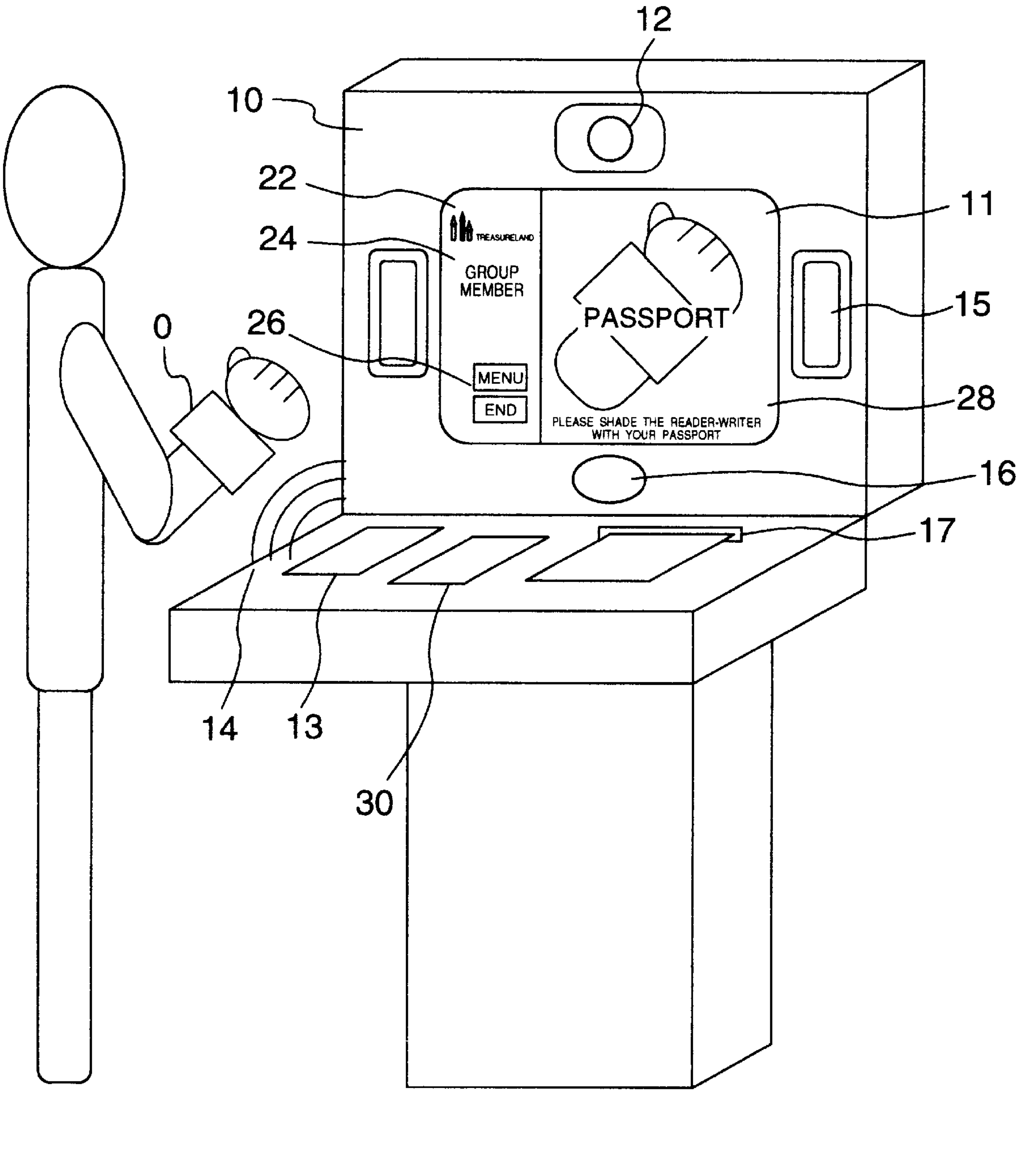
FIG. 2 is a model illustration showing a structure of a guide terminal for a theme park.

In turn, the description will be oriented to the theme park guide terminal according to this embodiment with reference to FIG. 2.

FIG. 2 is a model view showing a structure of the theme park guide terminal.

The theme park guide terminal 10 is served to exchange information with the park card so that it may be supplied with the input given by the user and display the necessary information. The necessary information is displayed on a display 11. This display 11 takes the form of a touch panel so that the user may touch a necessary portion, from which the user may input necessary information and proceed the operation along the guidance appearing on the display 11.

A numeral 13 denotes a reader-writer that radiates weak electric waves 14, through which the information is allowed to be read from or written in a park card 0.

Moreover, a camera 12, a speaker 15, and a microphone 16 are provided for the purpose of inputting a message on the guide terminal and transferring the message to another person of a group. A printer 17 is used when part or all of the displayed content is printed.

The display 11 has a large screen on which there appear a log area 22, a status area 24, an operation area 26, and a message area 28. The status area 24 displays a log such as a service for which this system is used. The status area 24 is provided under the log area 22 so that the operating status of this terminal is displayed. This display example indicates the state of doing inter-group communications. The operation area 26 displays the functions necessary to the operation. The content of the operation depends on the state of each operating stage, so that the displayed content of the operation area 26 is changed in association with the displayed content of the status area 24, for example. The message area 28 displays a message about the operation given from the system to an operator or a message given from another operator.

In the lower portion of the theme park guide terminal 10, the reader-writer 13 for the card 0 and the printer 17 are located. Further, a second display 30 is provided for explaining the action and the operation of the reader-writer 13 and the printer. The message area 28 displays the messages of the operation and the state of the reader-writer 13 and the printer 17. Further, the second display 30 displays these messages as well. This makes great contribution to improving the operativity.

Action and Using Images of System for Aiding in Use of a Facility Arranged to Equip Visitors with Portable Information Storing Units In turn, the description will be oriented to the action and the using images of the system for aiding in the use of a facility arranged to equip each visitor with the portable information storing unit according to this embodiment with reference to FIGS. 3 to 21.

Figure 3:
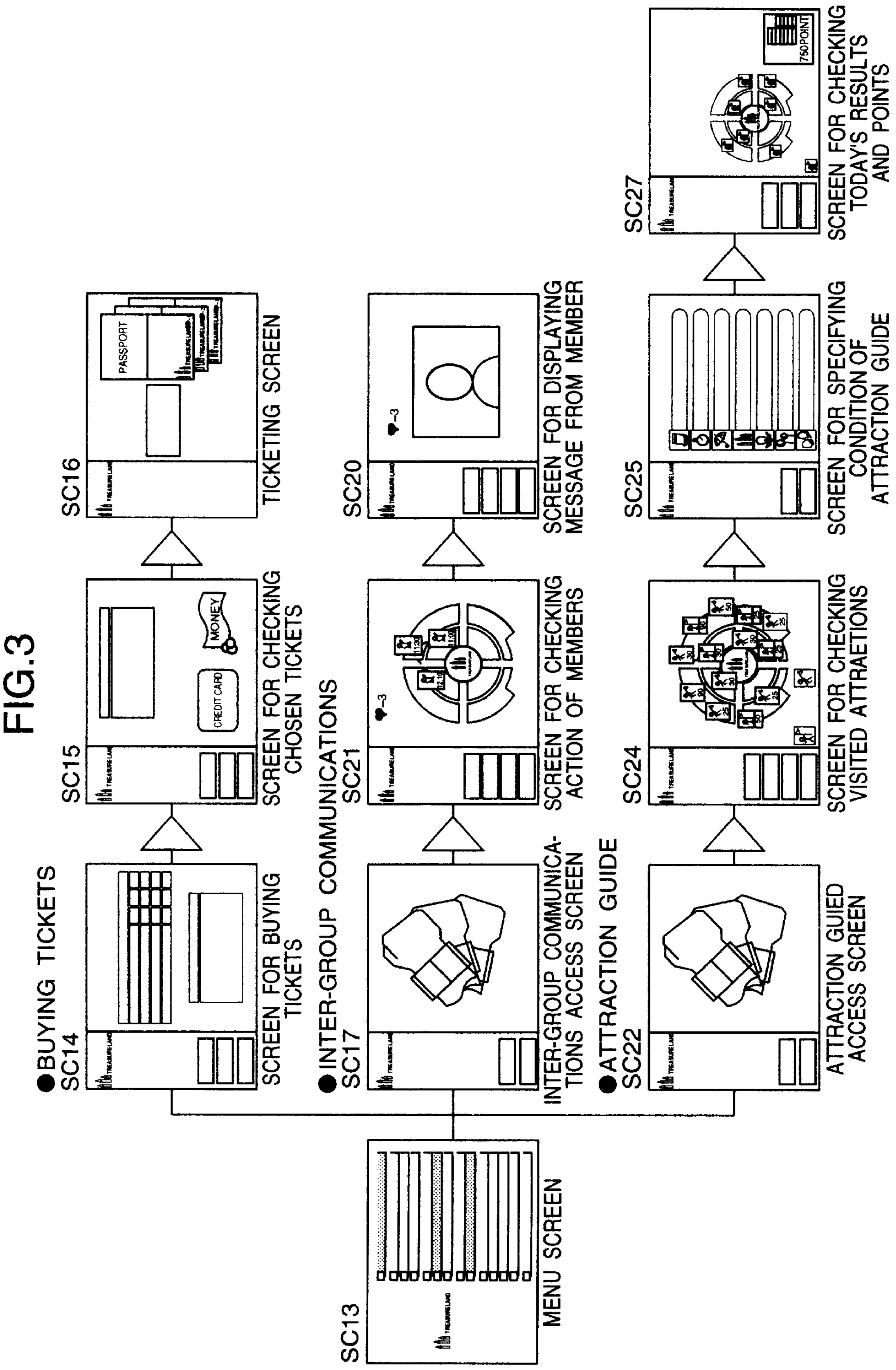
FIG. 3 is a screen transition view schematically showing an example of a screen transition of a system for aiding in the use of a facility arranged to equip each visitor with a portable information storing unit according to the present invention.

FIG. 3 is a screen transition view schematically showing an example of screen transition executed in the system for aiding in the use of the recreational facility arranged to equip each visitor with the portable information storing unit according to the present invention.

Figure 4A:
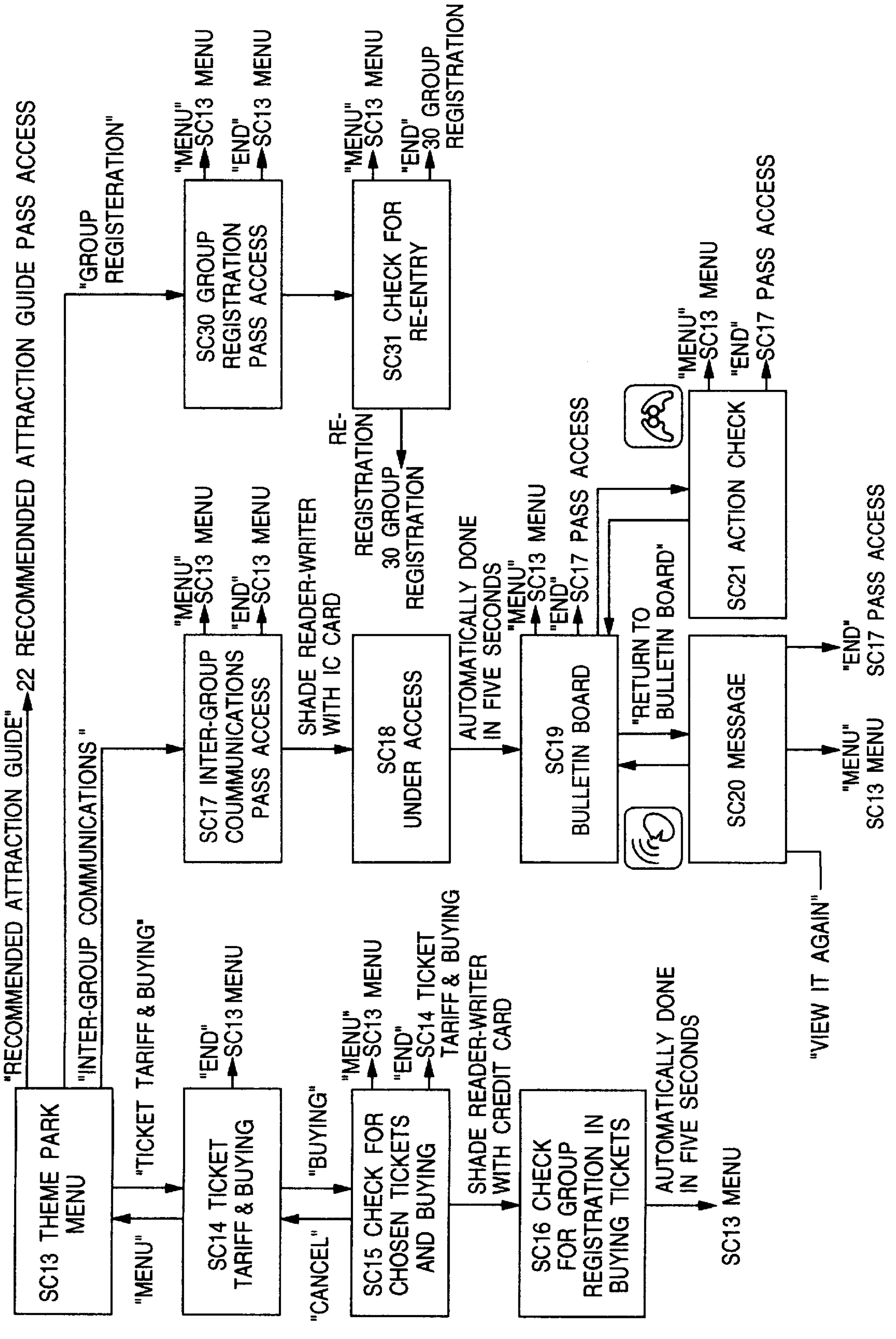
FIGS. 4A, 4B are screen transition views for describing screen transition described in this embodiment in correspondence to the action of a user.
Figure 4B:
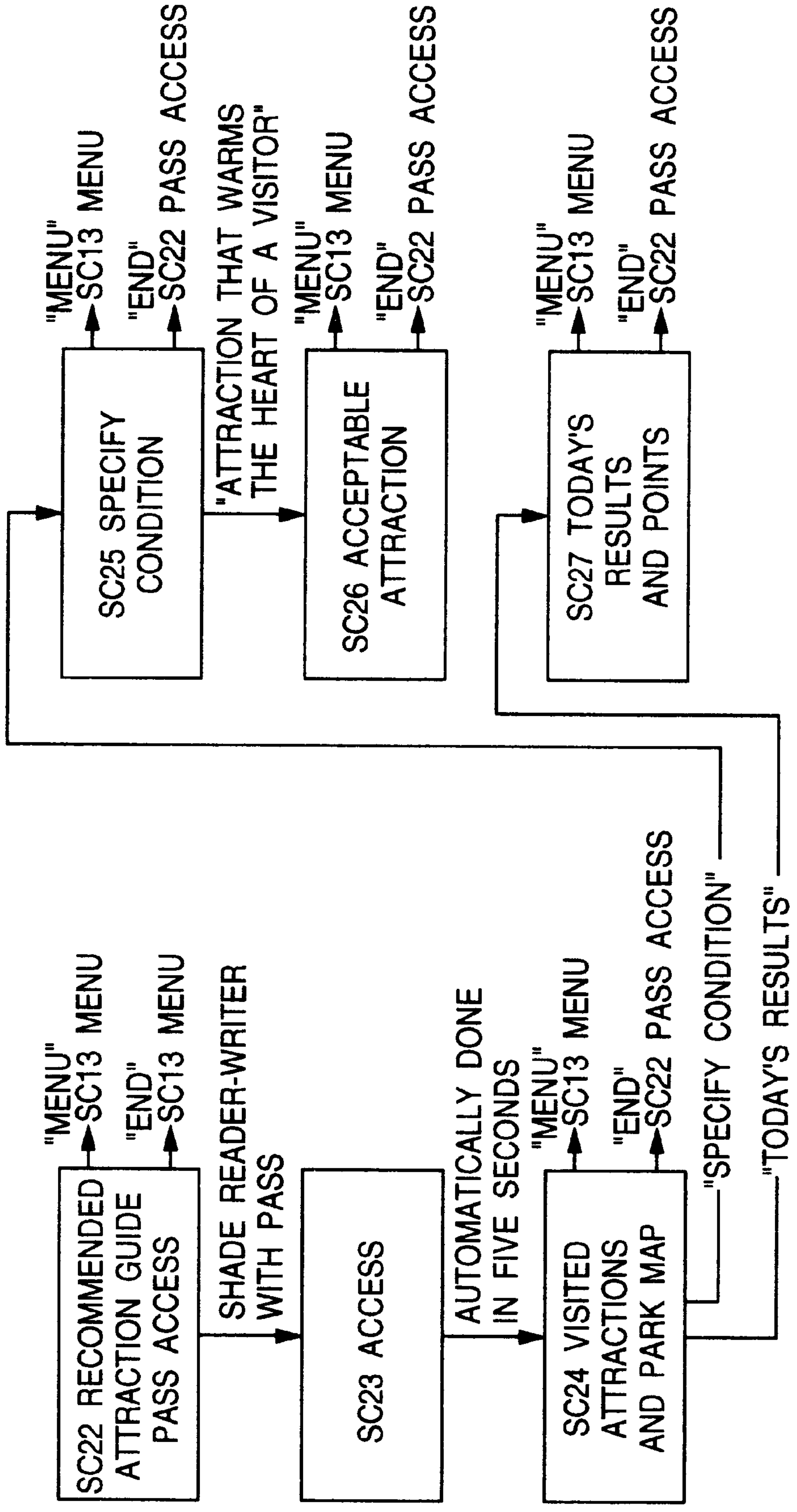

FIGS. 4A and 4B are screen transition views for describing the screen transition described in this embodiment in correspondence to the action of the user.

Later, the action of the storing unit will be described about each function with reference to FIGS. 3 and 4A and 4B.

(I) Theme Park Menu

At first, the theme park menu function will be described with reference to FIG. 5

Figure 5:
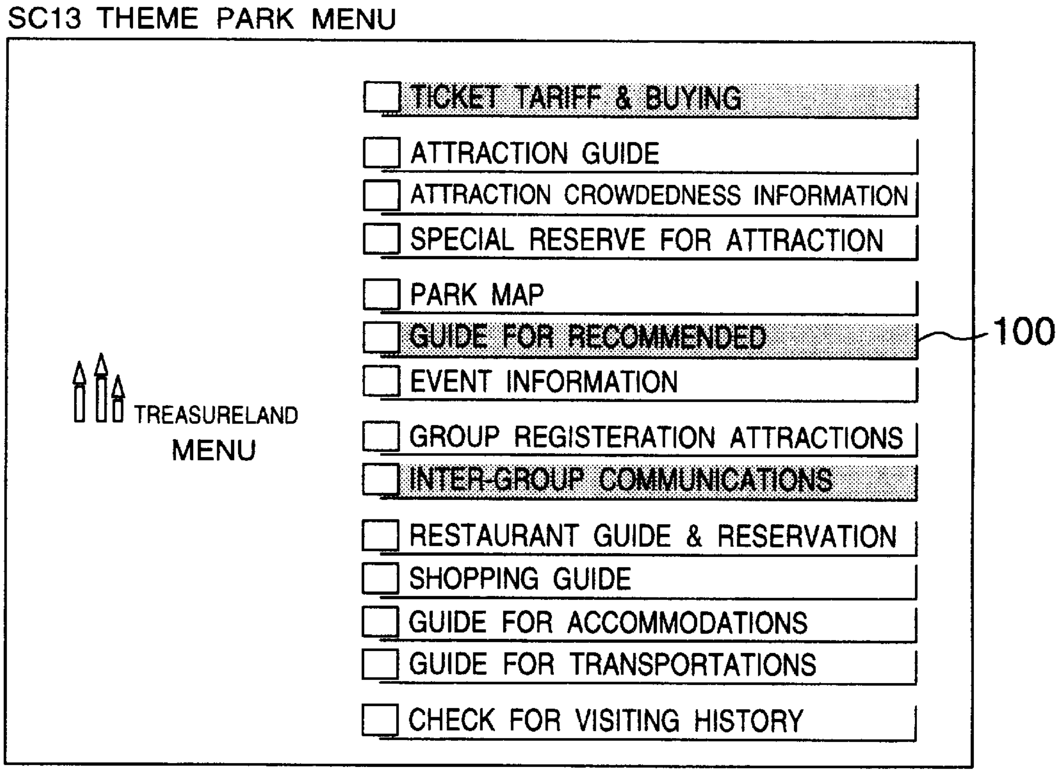
FIG. 5 is a model view showing a menu screen of a theme park.

FIG. 5 is a model view showing the screen of the theme park menu.

The user of the park card specifies his or her intentional function on the theme park menu 100. The user can call the screen of the function by touching the corresponding portion of the menu to the intentional function.

Hereafter, for example, it is considered that the user calls a function of buying a ticket, a function of registering a group, a function of inter-group communications, and a function of an attraction guide.

(II) Function of Buying a Ticket

Figure 6:
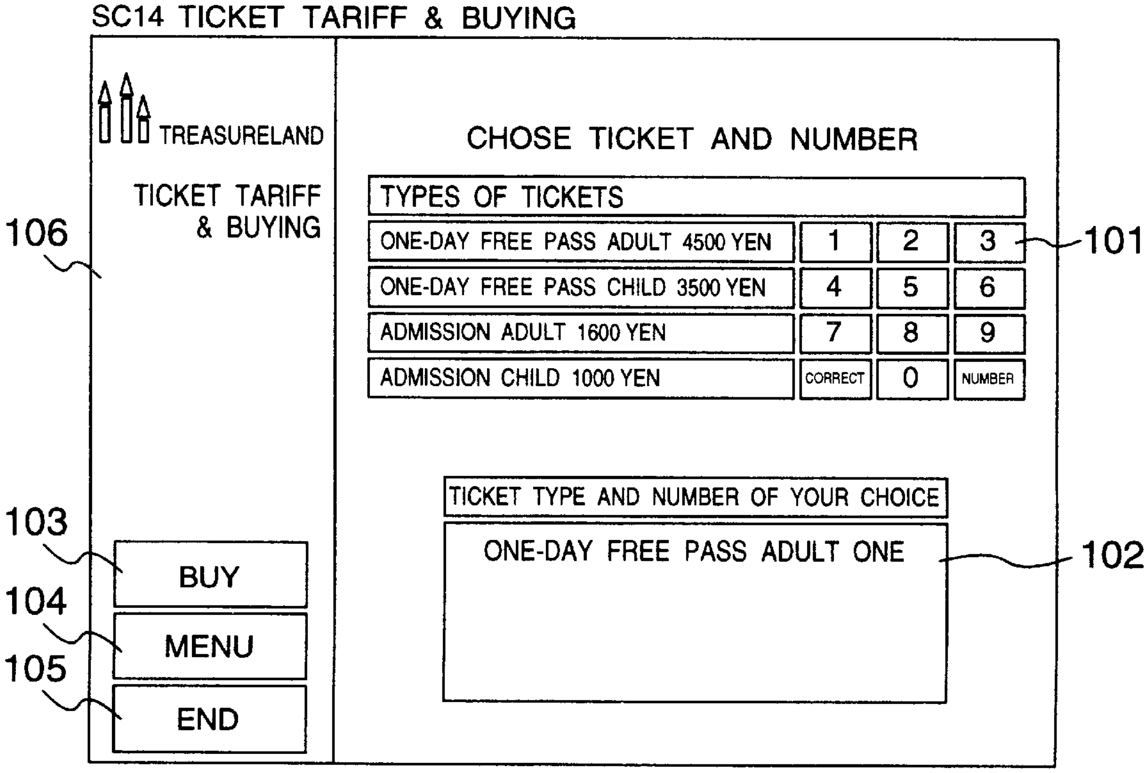
FIG. 6 is a model view showing a screen for indicating a ticket tariff and prompting a visitor to buy a ticket.
Figure 7:
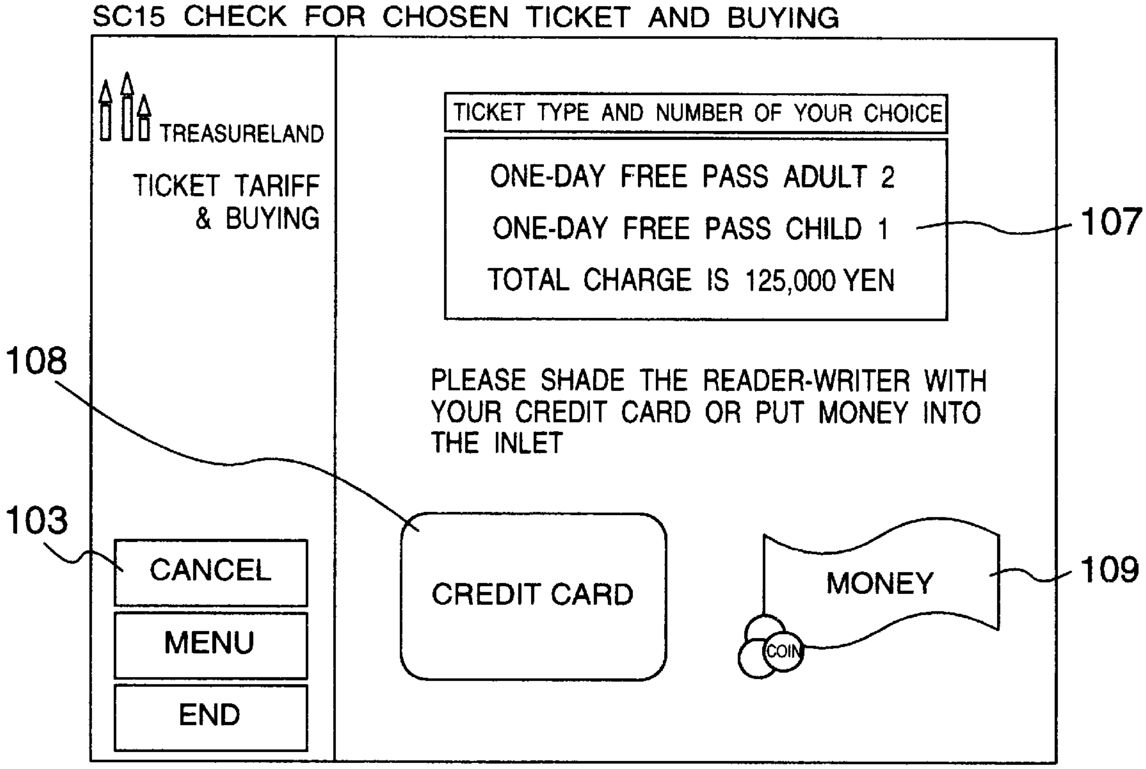
FIG. 7 is a model view showing a screen for checking ticket types and prompting a visitor to buy a ticket.
Figure 8:
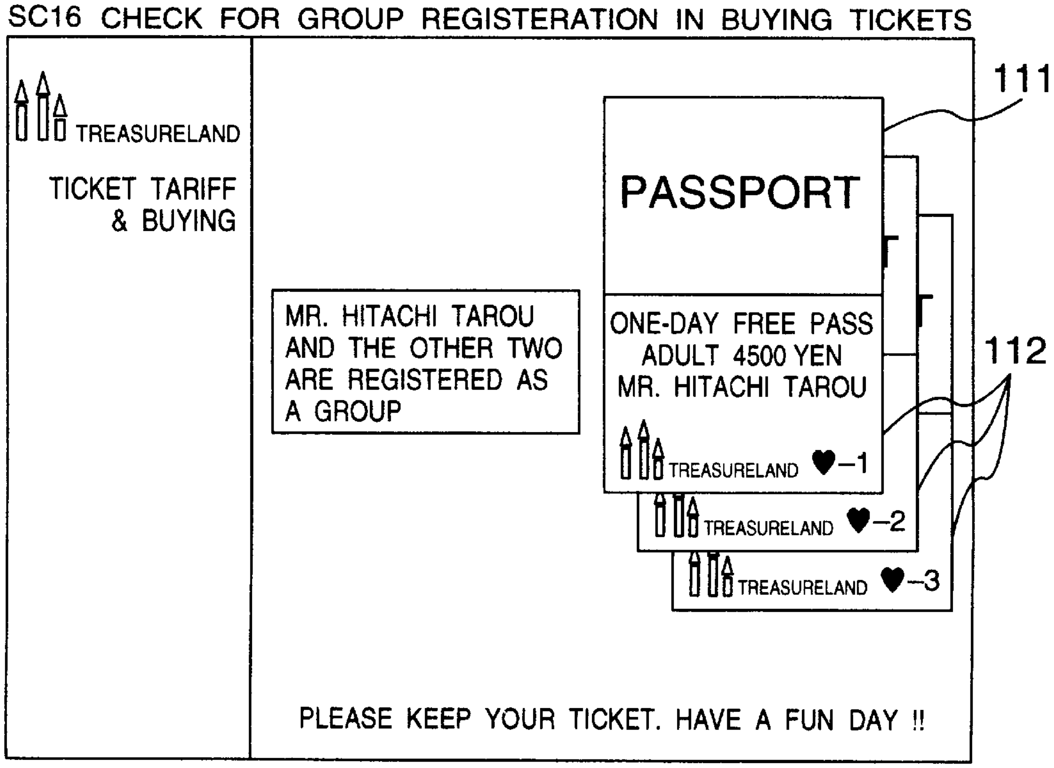
FIG. 8 is a model view showing a screen for registering and checking a group when buying a ticket.

At first, the description will be oriented to the procedure of guiding the user to buy a ticket through the guide function of buying a ticket with reference to FIGS. 6 to 8.

FIG. 6 is a model view showing a ticket tariff and a ticket-buying screen.

FIG. 7 is a model view showing a screen of indicating the types of ticket and prompting the user to buy the necessary ticket.

FIG. 8 is a model view showing a screen of registering and checking a group in buying a ticket.

By touching the item of a ticket tariff and buying on the theme park menu 100 shown in FIG. 5, the ticket tariff and buying screen SC14 is invoked as shown in FIG. 6. On this screen, a message appears so that it prompts the user to enter the proper type of ticket and number of tickets.

Herein, the user touches the item of the ticket type he or she wants to buy and the portion of the template keys located in the right hand for specifying the necessary number of the tickets. The result of the operation appears on the portion of the ticket type and the specified ticket number as shown in FIG. 6.

The left-hand portion 106 indicates the logo of this theme park, the currently-operating function, and the buttons for prompting the user to enter the corresponding commands. If the user touches the button of "Menu" 104, the screen is transited to the first theme park menu screen SC13. If the button of "End" 105 is touched, the current screen is finished and then the first screen of the current function is displayed. The detailed transition is as shown in FIGS. 4A and 4B. In addition, in either case, the screen shown in FIG. 6 is returned to the theme park menu.

Next, it is assumed that the user touches the button of "Buy" 103. In this case, the next content-checking and ticket-buying screen SC15 shown in FIG. 7 is displayed so that the types of the tickets selected up to now and the total fare are displayed on an area 107. If the displayed content is identical with the user's intent, the user merely shades the read-writer with his or her credit card and puts money into an inlet. The screen shown in FIG. 7 clearly displays the credit card picture 108 and the money picture 109. If the user wants to cancel it, the user just touches the button of "Cancel" 110.

When the user bought plural tickets at a batch, the persons who hold those tickets are automatically registered as a group. The screen SC16 for registering a group when buying tickets is displayed in FIG. 8. On the screen, an illustration of thickets 111 appears. The symbols located in the lower right portion of the ticket illustration indicate a heart and a number 111, which herein indicate that a group of three persons is registered. In this example, since three tickets are bought with a credit card at a batch, one person's name "HITACHI Tarou" described on the credit card is described in the ticket illustration. As will be discussed below, each group member buys his or her ticket and then may be registered as a group.

Herein, the term "ticket" is often used. In actual, however, the person who bought the ticket holds the foregoing "park card" served as a ticket as well.

(III) Function of Registering Group

Figure 9:
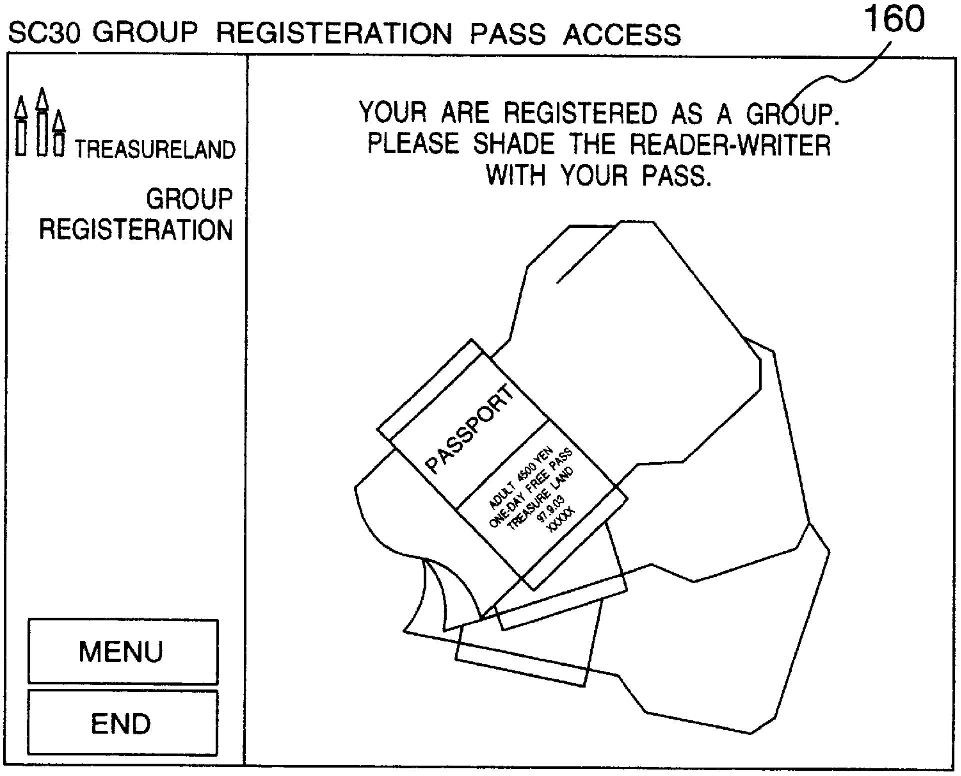
FIG. 9 is a model view showing a pass access screen for registering a group.
Figure 10:
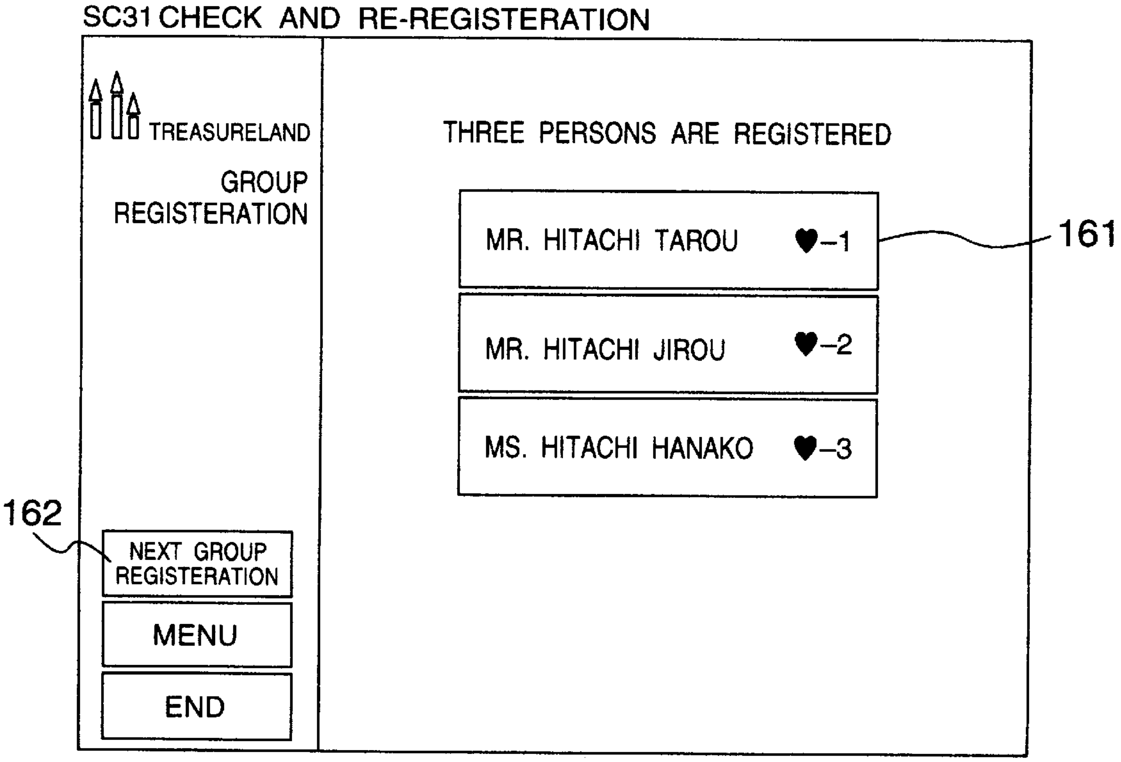
FIG. 10 is a model view showing a screen for registering, checking and re-registering a group.

At first, the description will be oriented to the procedure of how the user registers a group through the effect of the group registering function with reference to FIGS. 9 and 10.

FIG. 9 is a model view showing a pass access screen for registering a group.

FIG. 10 is a model view showing a screen for registering, checking and re-registering a group.

When the payments of the group members are different from each other or the buying times of the group members may be different from each other, each member buys the park card. At this time, by touching the item of the group registration on the theme park menu screen SC13 shown in FIG. 5, the group may be registered.

When the user touches the item of the group registration on the theme park menu, the pass access screen SC30 for the group registration shown in FIG. 9 is displayed. According to the message 160, the user shades the reader-writer 13 shown in FIG. 2 with the park card. The reader-writer 13 operates to read the information from the park card and register the holder of the park card in a group. The result is displayed on the screen SC31 for registering, checking and re-registering a group shown in FIG. 10. A display portion 161 of the group members indicates each member's name and a combination of a heat of a number for corresponding to an identification code of each group member as shown in FIG. 10.

When a new group member is registered, someone of the members touches the "Next Group Registration" item 162. Then, the screen is returned to the pass access screen SC30 for registering a group, on which a new group member may be registered.

(IV) Inter-group Communications Function

In turn, the description will be oriented to the inter-group communications function with reference to FIGS. 11 to 15.

Figure 11:
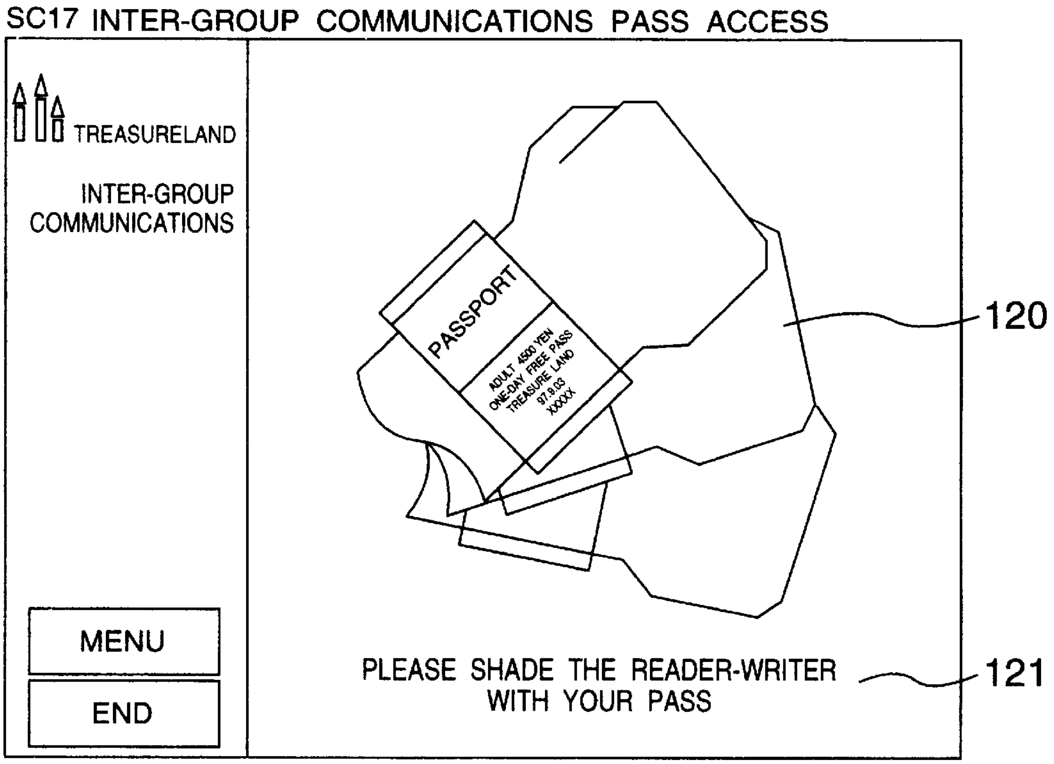
FIG. 11 is a model view showing a pass access screen for inter-group communications.

FIG. 11 is a model view showing a pass access screen for the inter-group communications.

Figure 12:
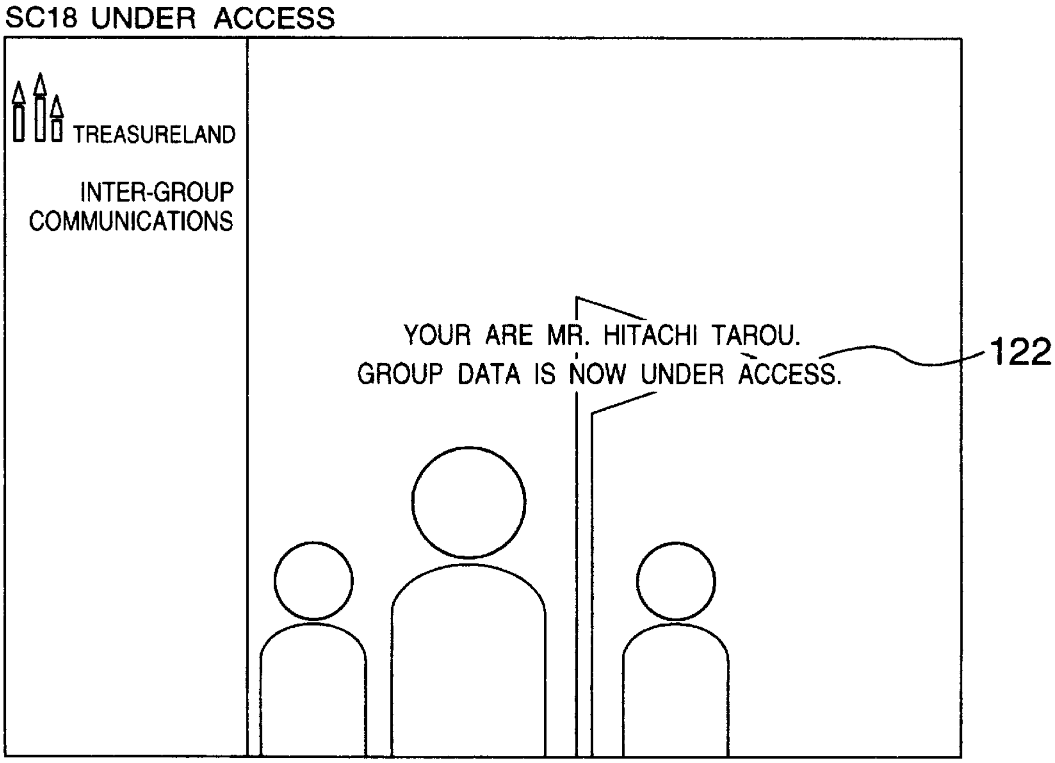
FIG. 12 is a model view showing a screen on which the group data is being accessed in the inter-group communications.

FIG. 12 is a model view showing a screen for indicating that the group data is being accessed in the inter-group communications.

Figure 13:
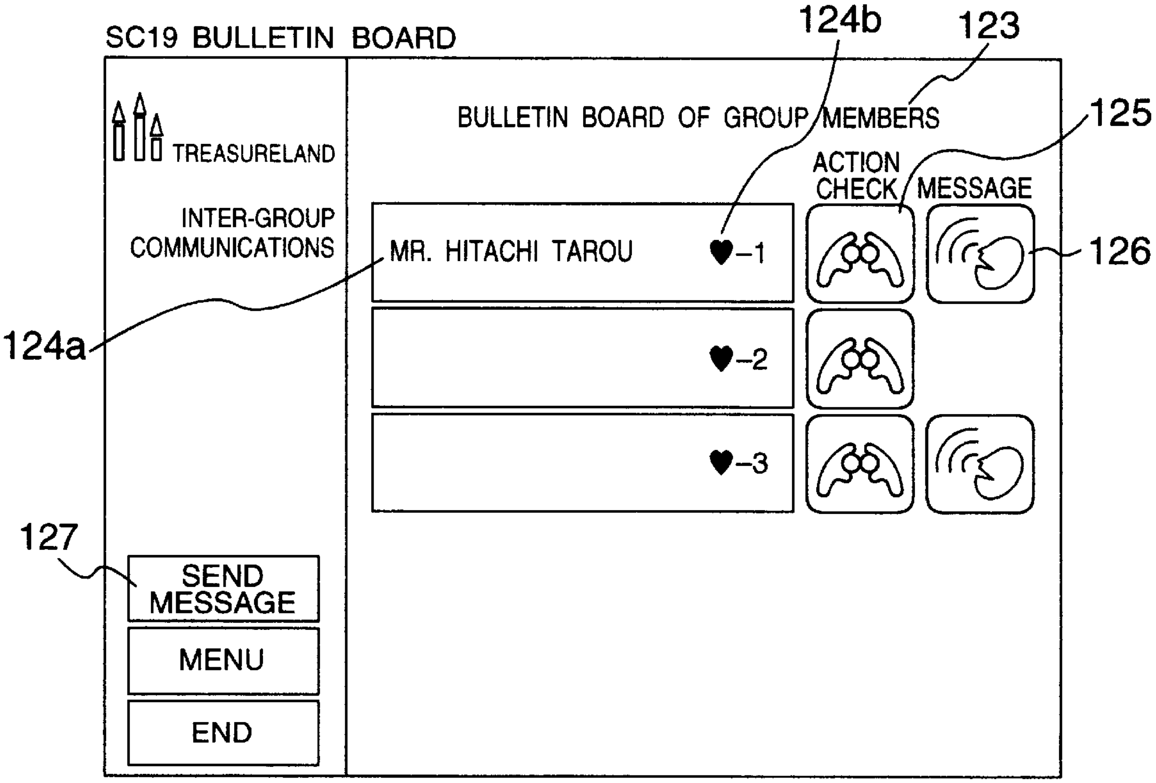
FIG. 13 is a model view showing a screen for displaying a bulletin board of group members.

FIG. 13 is a model view showing a bulletin board screen for the group members.

Figure 14:
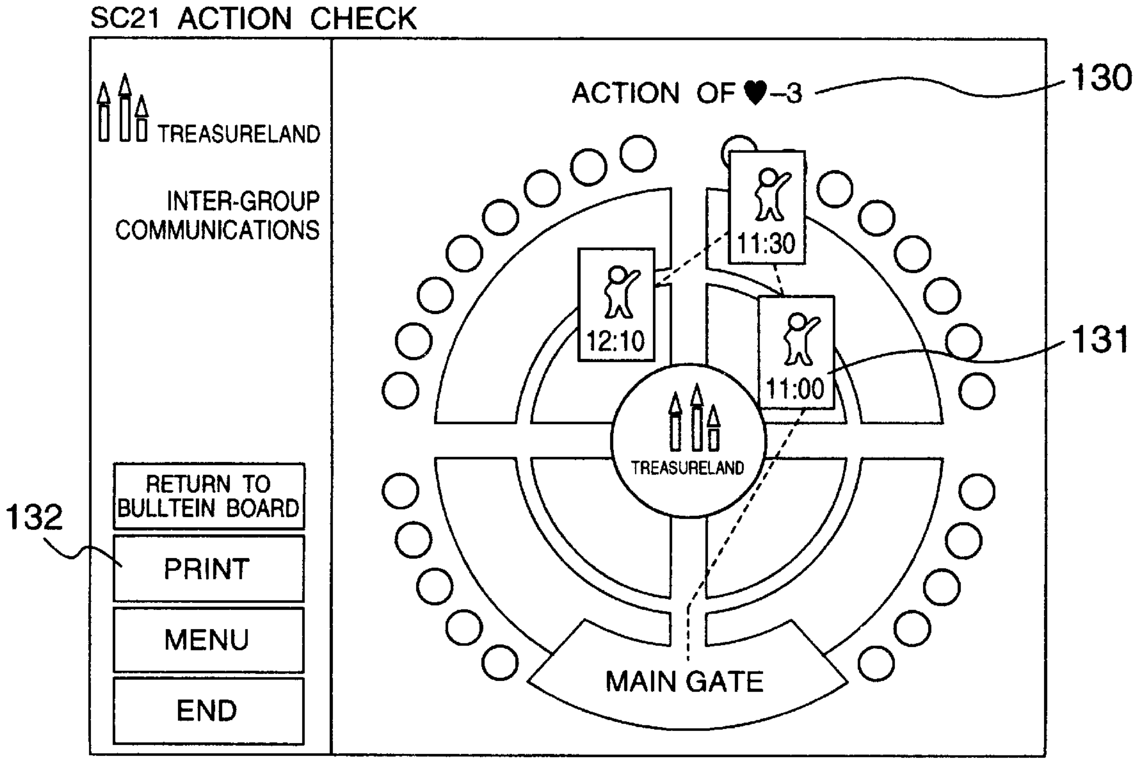
FIG. 14 is a model view showing a screen for checking action of each group member.

FIG. 14 is a model view showing a screen for checking the action of each group member.

Figure 15:
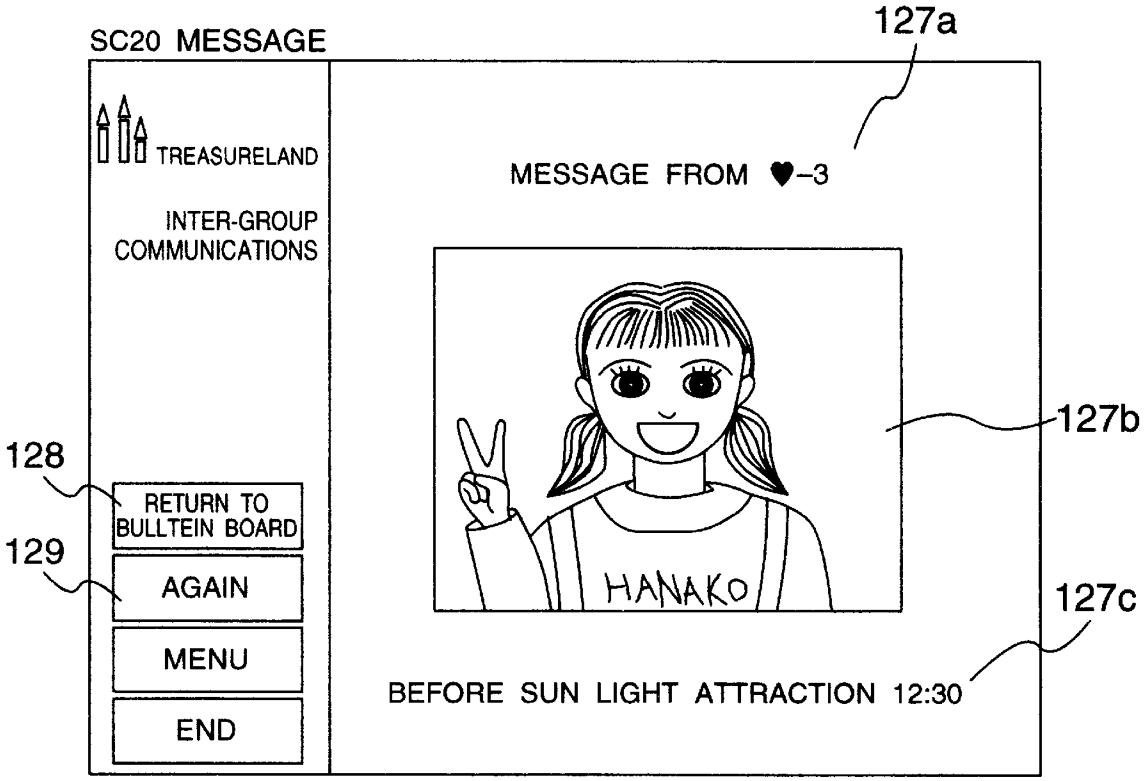
FIG. 15 is a model view showing a message screen given by a group member.

FIG. 15 is a model view showing a screen for indicating a message given from a group member.

The description so far has been oriented to how a group is registered. The main advantage of the group registration is that if the group members go around the recreational facility separately, each group member can grasp the action of another member to some extent and exchange a message with another member.

For example, someone of the group wants to move separately from the group. Or someone of the group may be stray in the facility. This group registration is quite convenient to these cases, so that it may enhance the pleasure taken by each member in the theme park.

In order to execute the inter-group communications, the group member touches the item of the inter-group communications function appearing on the theme park menu screen SC13 shown in FIG. 5.

Then, the screen SC17 shown in FIG. 11 is displayed. This screen SC17, as mentioned above, corresponds to the pass access screen for the inter-group communications. Along the picture 120 depicting the necessary action and the message 121, the user shades the theme park guide terminal 10 with the pass.

If a relatively long time is taken in communicating with a server after accessing the theme park guide terminal 10, another message 122 is displayed on the screen SC18 on which the group data shown in FIG. 12 is being accessed.

When data is downloaded from the server, the bulletin board screen SC19 of the group member shown in FIG. 13 is displayed. On this screen, a list of the group members is displayed together with a title 123. If a name 124*a* of the group member is grasped like the name "HITACHI Tarou" in FIG. 13, the name, the identification code and the symbol 124*b* are displayed.

On the screen SC19 shown in FIG. 13, an action check icon 125 appears if the action of a group member may be checked and a message icon 126 appears if a message from a group member is reached. Further, when the group member wants to send a message, the group member touches an icon for indicating a message transfer or an item 127.

It is assumed that the user touches the action check icon 125 of the heart-3 on the bulletin board. Then, the action check screen SC21 of the group members shown in FIG. 14 appears on the terminal.

On this action check screen, the action of the member with the heart-3 is displayed by an animation 131 in a time sequence together with the time indications as shown in FIG. 14. It means that when the member with the heart-3 enters into an attraction facility in the theme park, the system grasps the action of the member. To keep track of the member in more detail, plural sensors are located at regular intervals in the theme park. When a person with the park card passes through the sensor, the sensor serves to sense the time and the card code. This system thus makes it possible to keep track of the member in more detail.

By touching the item "Print" 132, the printer 17 shown in FIG. 2 is enabled to print the screen. Next, it is assumed that the user touches the message icon 126 on the bulletin board screen shown in FIG. 13.

At this time, on the theme park guide terminal shown in FIG. 2, the message screen SC20 shown in FIG. 15 is displayed. The message screen SC20 indicates a message sent from another group member. On the screen SC20 are displayed a display portion 127*a* for indicating that the message is sent from the member with the heart-3, a still picture or an animation 127*b* of the member, a voice message, and a place and time indication 127*c*. FIG. 15 shows the screen where a pretty girl who is the member with the heart-3 gives the other members a V sign. The transfer of an animation message disadvantageously needs a large storage capacity and a heavy load burdened on the system. From a viewpoint of a user interface, however, it is advantageous.

If the user wants to view the animation again or hear the voice again, the user touches the item "View it again" 129. If the user wants to return it to the bulletin board screen on which the other operation is to be done, the user touches the item "Return to the Bulletin Board" 128.

(V) Attraction Guide Function

Next, the description will be oriented to the attraction guide function with reference to FIGS. 16 to 21.

Figure 16:
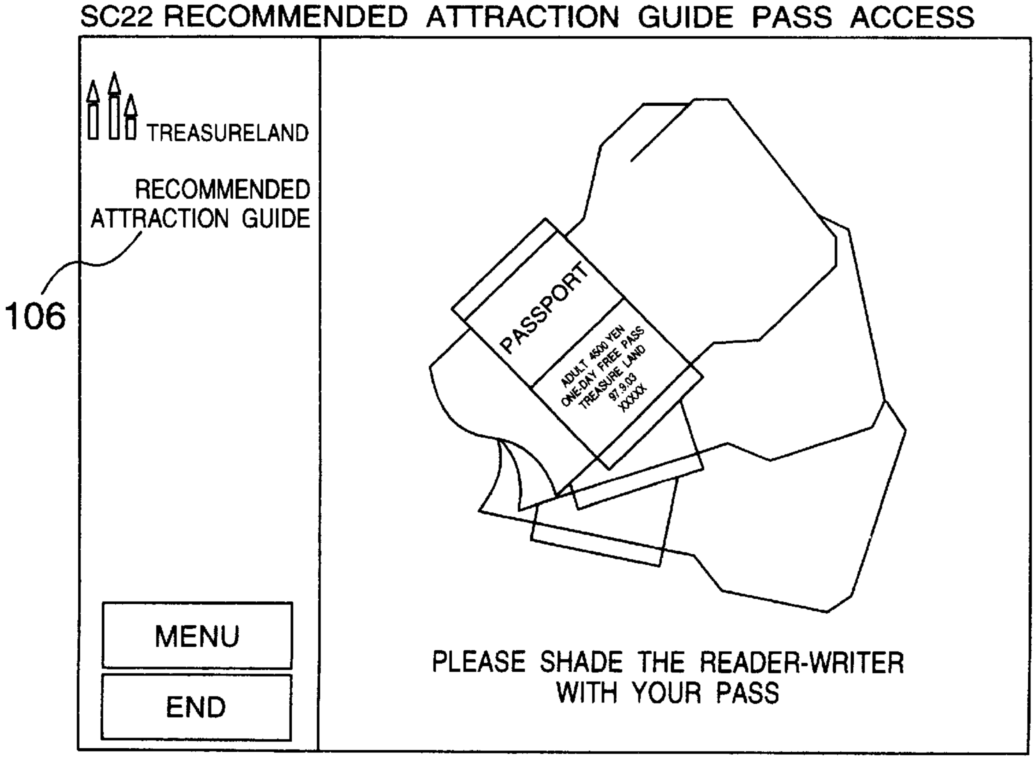
FIG. 16 is a model view showing a pass access screen of an attraction guide.

FIG. 16 is a model view showing a pass access screen for the attraction guide.

Figure 17:
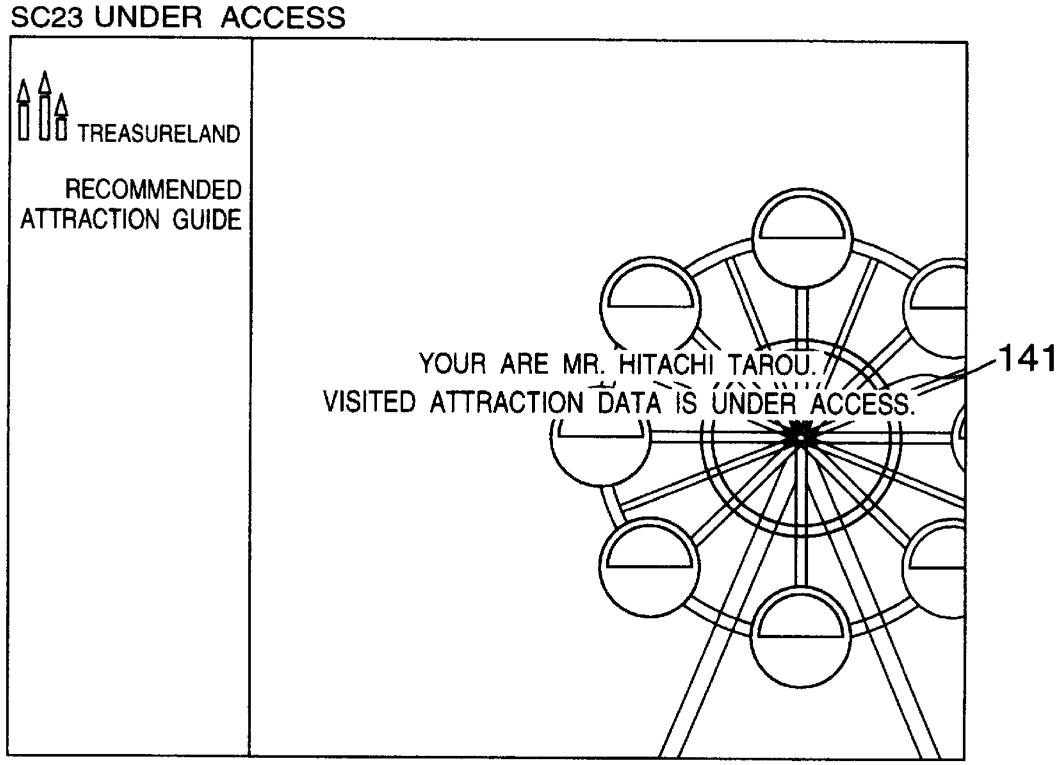
FIG. 17 is a model view showing a screen on which the group data included in the attraction guide is being accessed.

FIG. 17 is a model view showing a screen where the group data is being accessed in the attraction guide.

Figure 18:
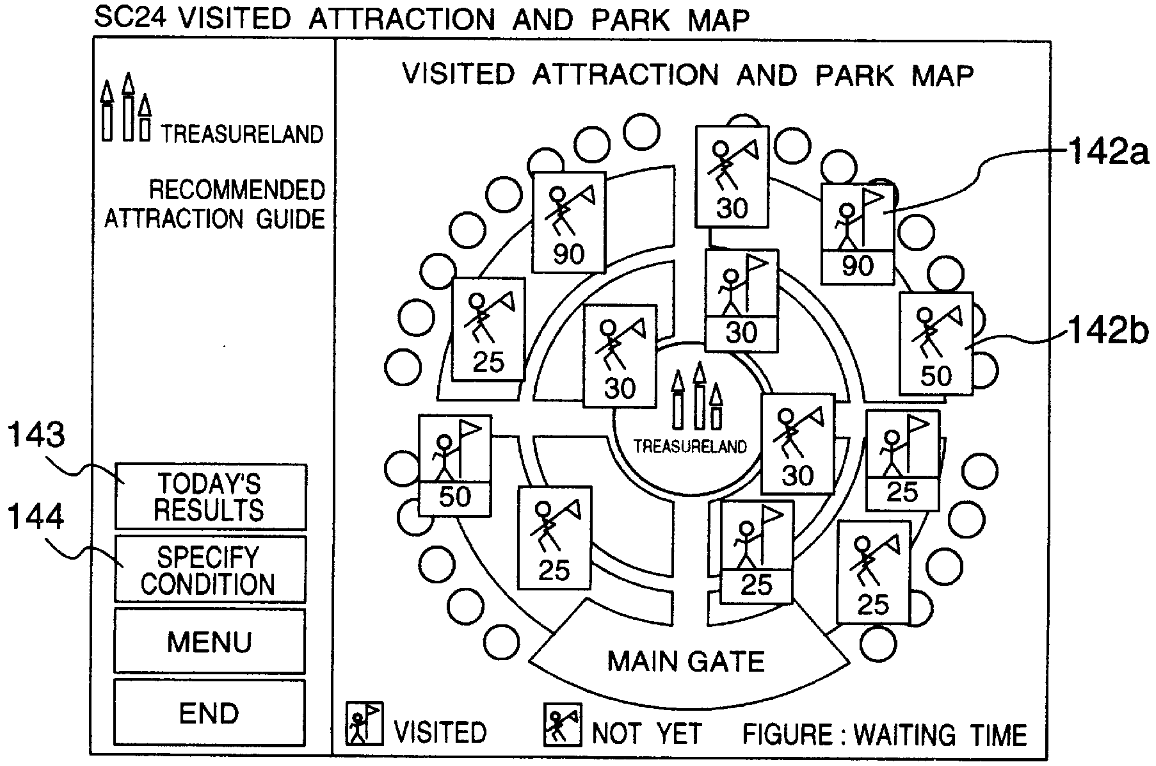
FIG. 18 is a model view showing a screen for indicating visited attractions and a map of a theme park.

FIG. 18 is a model view showing a screen where the visited attractions and the park map appear.

Figure 19:
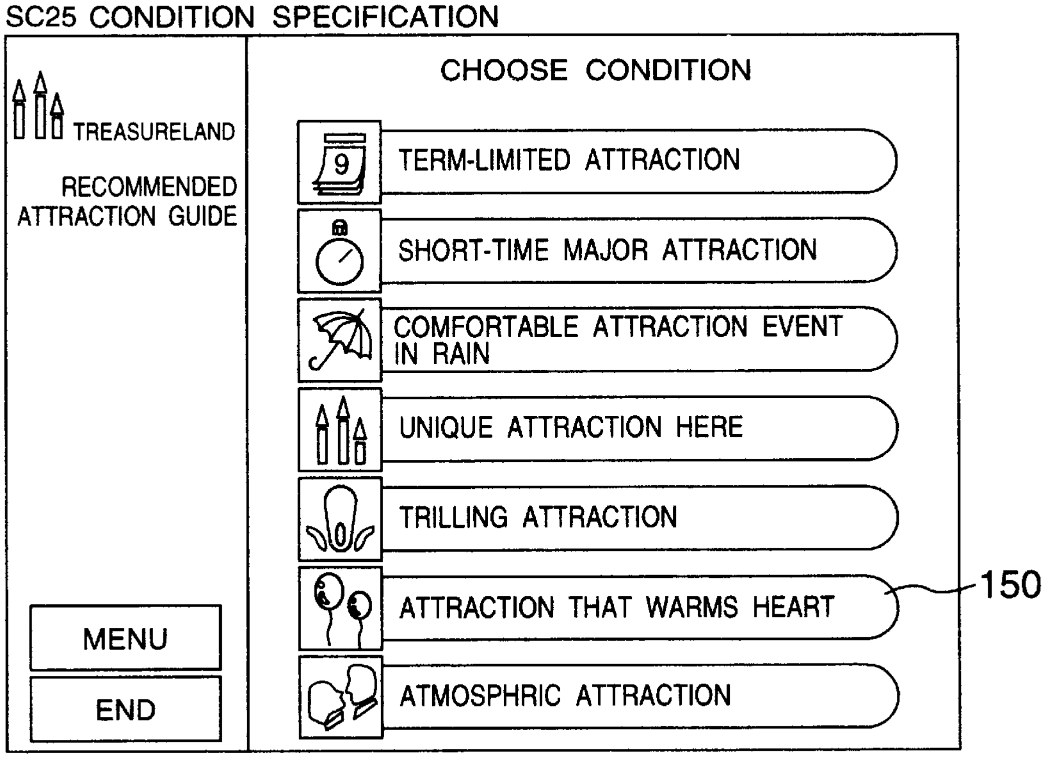
FIG. 19 is a model view showing a screen for prompting a user to specify a condition.

FIG. 19 is a model view showing a screen where conditions are to be specified.

Figure 20:
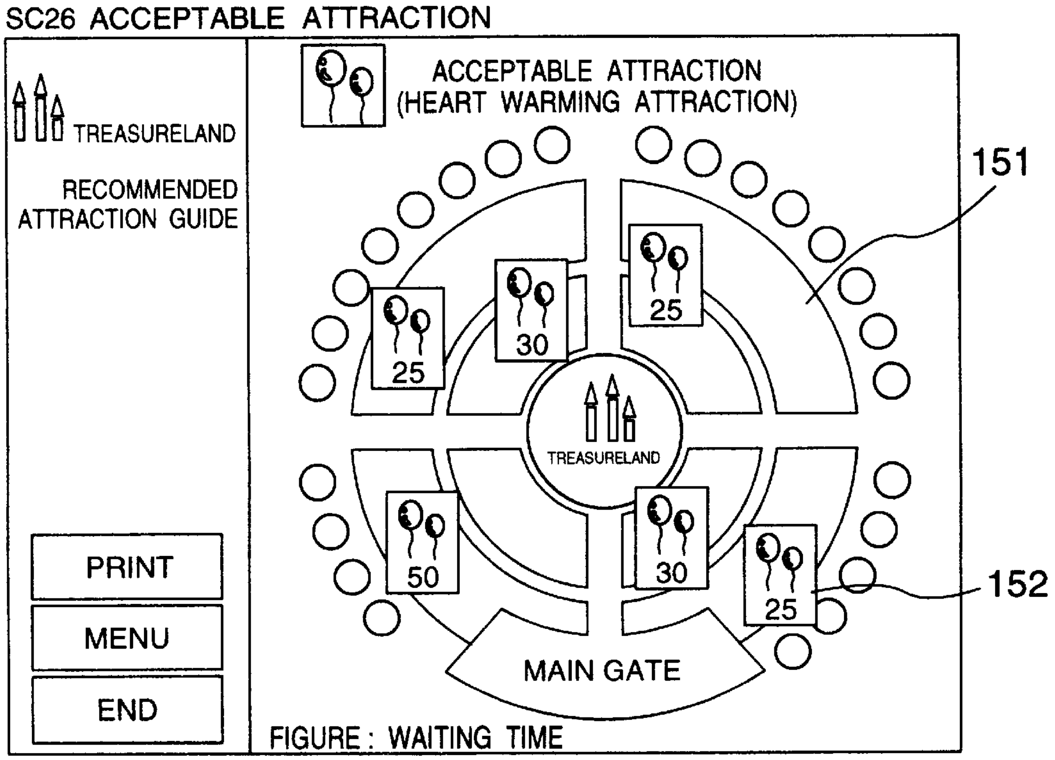
FIG. 20 is a model view showing a screen for indicating an attraction according to the specified condition.

FIG. 20 is a model view showing an attraction screen according to the specified condition.

Figure 21:
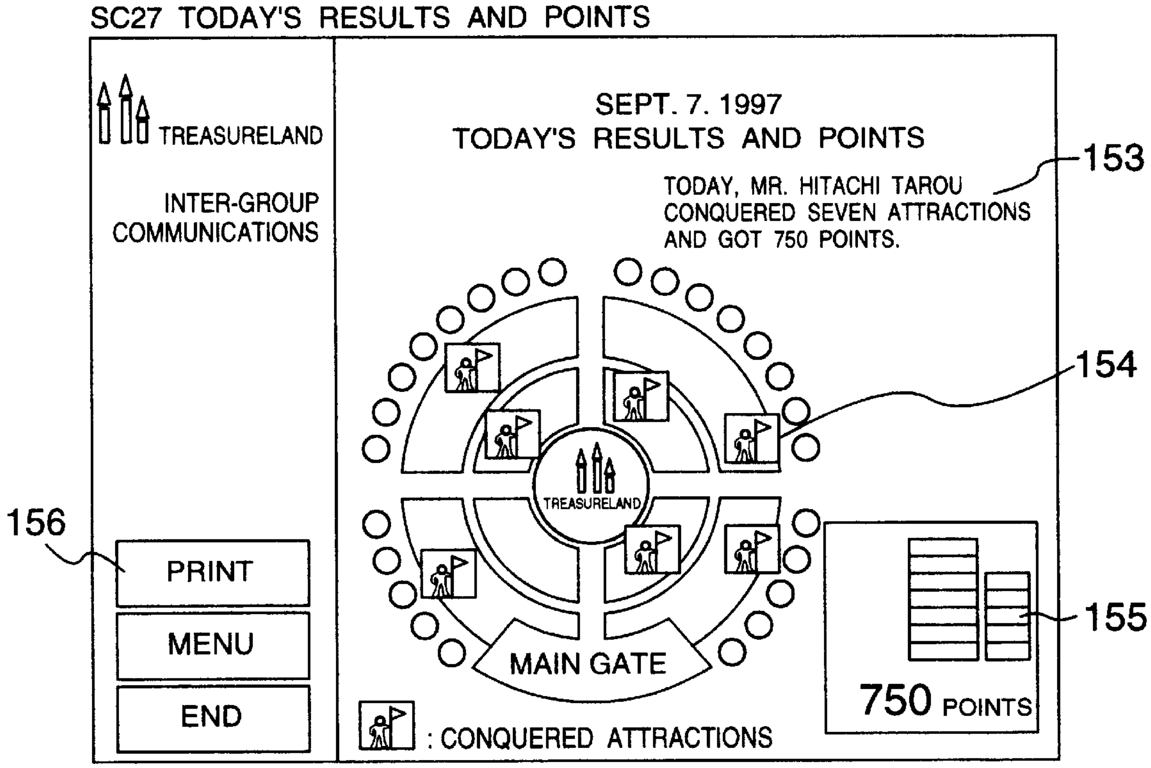
FIG. 21 is a model view showing a screen for indicating today's results and obtained points.

FIG. 21 is a model view showing the screen where the today's results and the obtained points.

Persons who visit the theme park range from the child to the old in age, so that their tastes are variable. Some like a thrilling attraction, while some like a slowgoing one. In particular, the persons' tastes of an amusement are so variable, which thus requires a guide. Further, it may be necessary to show the visiting history of a user and the waiting time of an attraction facility the user now wants to enjoy.

Also for using the attraction guide, at first, the user touches the item of the attraction guide on the theme park menu screen SC13 shown in FIG. 5.

Then, the screen is transited to the pass access screen SC22 of the action guide shown in FIG. 16. Along the picture 120 depicting the necessary action and the message 121, the user shades the proper portion of the theme park guide terminal 10 shown in FIG. 2 with the park card. This is the same procedure as that described before.

If a considerably long time is taken in communicating with the server after accessing the theme park guide terminal 10 shown in FIG. 2, the screen SC23 on which the attraction data is being accessed is served to indicate a message 141.

When data is downloaded from the server, the screen is transited to the screen SC24 for displaying the visited attractions and the park map shown in FIG. 18. On this screen, the park map, the attractions 142*a* the user has already visited, and the attractions 142*b* the user does not visit yet are distinguished from one another.

Further, the screen also indicates the waiting time of each attraction, which is useful information for the user. If the user would like to make an effective use of his or her time, the user preferably goes to the attraction with a relatively shorter waiting time without going to the attraction that needs a long waiting time.

It is requested that the data on the waiting time are collected in the server. In place, however, a staff may report the waiting time for which he or she is responsible to the center. Or, it is possible to build a system for automatically collecting data by locating sensors in places where persons for waiting for attractions are queued up.

When the user wants to specify the favorite condition and select the attraction he or she would like to visit, the user touches the "Specify the condition" item 144. Then, the screen is transited to the screen SC25 for specifying the condition shown in FIG. 19. The user touches the favorite item of the menu 150. For example, the item of "attraction that warms the cockles of the heart" is selected. Then, the screen is transited to the screen SC26 for attractions meeting the selected condition as shown in FIG. 20. This screen displays on the park map 151 the attraction for meeting the selected condition with the waiting time 152.

On the other hand, when the user decides to leave the theme park, the user may touch the "Today's result" item 143 shown in FIG. 18 for checking the visited attractions. At this time, the screen for the today's results and the obtained points SC27 is displayed as shown in FIG. 21.

This screen indicates on the park map the attractions the user has visited today with the flags raised in addition to a message 153 about the obtained points and a point icon 155. Such a demonstration may result in satisfying the user's desire for conquering the attractions and making the user have a victorious feeling on his or her way back.

The points are a kind of service the operator of the theme park provides to the user. More often the user uses the park card, more points the user gets. The points the user got may be swapped with the corresponding gift, cash or special invitation ticket. This system may press a person who visited the theme park once to the next visit.

By touching the "Print" item 156, the user may bring the "results" back to his or her home.

Moreover, it is possible to print the attractions the user entered at that day on the park card as the history. In this case, the card terminal installed in the theme park may be provided with a printing function.

This attraction guide function is required to record the history of the attractions the user have visited since. This is effective if the part card is used in the succeeding visits.

This type of successive card allows the user to utilize the history of the attractions at the previous visits. This makes it possible to avoid the visit of the already-visited attraction because the user forgets it. Or, the user may have a pleasure of reaching the conquest of all the attractions in the theme park after several visits.

Moreover, the system may be arranged to save the condition specified on the condition-specifying screen in the past. In this arrangement, the operator of the theme park may grasp the user's taste and may provide the user with the service of displaying a guide screen for a new attraction for meeting the previously specified conditions if any.

As set forth above, the present invention may offer a system and a method for aiding in the use of the facility which are arranged to supply information according to a user's action by using a portable card or the like, so that they may generally provide a more comfortable environment when the user visits the facility.

What is claimed is:

1. The method for aiding in the use of a facility arranged to equip each visitor with a portable information storing unit, comprising:

registering plural visitors as a group in each portable information storing unit so that one of said group holding a portable information storing unit may determine how the other visitors of said group are moving about said facility; and displaying the action of the other visitors holding a portable information storing unit on a display of an access terminal for said portable information storing units as a visiting status and a visiting time of each visitor in said facility.

2. The method for aiding in the use of a facility arranged to equip each visitor with a portable information storing unit, comprising:

registering plural visitors as a group in each portable information storing unit so that one of said group holding a portable information storing unit may determine how the other visitors of said group are moving about said facility; and issuing said portable information storing unit as a qualification ticket for said facility, when said portable information storing units are to be registered as one group.

3. The method for aiding in the use of a facility arranged to equip each visitor with a portable information storing unit, comprising:

registering plural visitors as a group in each portable information storing unit so that one of said group holding a portable information storing unit may determine how the other visitors of said group are moving about said facility; and registering said portable information storing units in a group through said access terminal.

4. A method for aiding in the user of a facility arranged to equip each visitor with a portable information storing unit, comprising:

enabling an access terminal for said portable information storing unit provided in said facility to display visitable unit facilities located in said facility, a visiting history about said unit facilities of the visitor holding said portable information storing unit, and a waiting time of each of said unit facilities.

5. The method for aiding in the use of a facility arranged to equip each visitor with a portable information storing unit, comprising:

registering plural visitors as a group in each portable information storing unit so that one of said group holding a portable information storing unit may determine how the other visitors of said group are moving about said facility, wherein said portable information storing unit serves as a ticket for unit facilities located in said facility and electronic money as a substitute for cash.

6. The method for aiding in the use of a recreational facility arranged to equip each visitor with a portable information storing unit as claimed in claim 5, wherein said access terminal located in said recreational facility includes a function of printing data on the surface of said portable information storing unit so that the visiting history of a certain visitor may be printed on the surface of said portable information storing unit when said visitor enters into one of the unit facilities provided in the recreational facility.

7. A recording medium for recording a computer program to be executed by a computer for aiding in the use of a facility arranged to equip each visitor with a portable information storing unit, said computer program when executed causes the computer to execute:

registering plural visitors as a group in each portable information storing unit so that one of said group holding a portable information storing unit may determine how the other visitors of said group are moving about said facility.

8. A system for aiding in the use of a facility arranged to equip each visitor with a portable information storing unit, comprising:

one or more access terminals for said portable information storing units;

a computer system for managing system information, wherein said computer system communicates with said access terminals through communications lines so that information may be transferred between said computer system and said access terminals; and means for holding a group code of a portable information storing unit of each visitor for visiting each of unit facilities included in said facility and a visiting time of each visitor in said each unit facility, wherein if one of the visitors puts his or her portable information storing unit into an access terminal, then the visiting history in said facility of the portable information storing units of the other visitors with the same group code as that of said portable information storing unit put into said access terminal are displayed on said access terminal.

9. A system for aiding in the use of a facility arranged to equip each visitor with a portable information storing unit, comprising:

one or more access terminals for said portable information storing units;

a computer system for managing system information, wherein said computer system communicates with said access terminals through communications line so that information may be transferred between said computer system and said access terminals; and means for holding a group code of a portable information storing unit of each visitor for visiting each of unit facilities included in said facility and a visiting time of each visitor in said each unit facility, wherein messages being held in said access terminals in the form of an animation, a still picture or voice are communicated among the visitors holding said portable information storing units belonging to the same group through said access terminals.

10. A system for aiding in the use of a facility arranged to equip each visitor with a portable information storing unit, comprising:

one or more access terminals for said portable information storing units;

a computer system for managing system information, wherein said computer system communicates with said access terminals through communications lines so that information may be transferred between said computer system and said access terminals; and means for determining a trend of visitors of each of unit facilities located in said facility through use of a sensor for sensing portable information storing units of said visitors, and a waiting time of each unit facility and displaying said trend and waiting time on said access terminal.

11. A method for aiding in the use of a facility arranged to equip each visitor with a portable information storing unit, comprising:

registering plural visitors as a group in each portable information storing unit so that one member of said group can exchange a message with another of said group through an access terminal for said portable information storing unit provided in said facility executing the exchange of a message with the other visitors holding said portable information storing unit on said display of said access terminal in the form of an animation, a still picture or voice; and issuing said portable information storing unit as a qualification ticket for said facility, when said portable information storing units are to be registered as one group.

12. A method for aiding in the use of a facility arranged to equip each visitor with a portable information storing unit, comprising:

registering plural visitors as a group in each portable information storing unit so that one of said group holding a portable information storing unit may determine how the other visitors of said group are moving about said facility;

displaying the action of the other visitors holding said portable information storing units on a display of an access terminal for said portable information storing units as a visiting status and a visiting time of each visitor in said facility; and registering said portable information storing units in a group through said access terminal.

13. A method for aiding in the use of a facility arranged to equip each visitor with a portable information storing unit, comprising:

issuing each portable information storing unit as a qualification ticket for said facility, when said portable information storing units are to be registered as one group; and registering said portable information storing units in a group through an access terminal.

14. A method for aiding in the use of a facility arranged to equip each visitor with a portable information storing unit, comprising:

registering plural visitors as a group in said portable information storing units so that one member of said group can exchange a message with another of said group through an access terminal for said portable information storing units provided in said facility; and registering said portable information storing unit in a group through said access terminal.

15. A method for aiding in the use of a facility arranged to equip each visitor with a portable information storing unit, comprising:

registering plural visitors as a group in said portable information storing units so that one member of said group can exchange a message with another of said group through an access terminal for said portable information storing units provided in said facility, wherein each portable information storing unit serves as a ticket for unit facilities located in said facility and electronic money as a substitute for cash.

16. A method for aiding in the use of a facility arranged to equip each visitor with a portable information storing unit, comprising:

allowing said visitor to specify a condition of unit facilities located in said facility on an access terminal for said portable information storing units provided in said facility; and enabling said access terminal to display said unit facilities for meeting said specified condition, wherein said portable information storing unit serves as a ticket for said unit facilities located in said facility and electronic money as a substitute for cash.

17. A method for aiding in the use of a facility arranged to equip each visitor with a portable information storing unit, comprising:

registering plural visitors as a group in each portable information storing unit so that one of said group holding a portable information storing unit may determine how the other visitors of said group are moving about said facility, wherein said portable information storing unit serves as a ticket for unit facilities located in said facility and electronic money as a substitute for cash, wherein said access terminal located in said facility includes a function of printing data on a surface of a portable information storing unit so that the visiting history of a certain visitor may be printed on the surface of said portable information storing unit when said visitor enters into one of said unit facilities provided in said facility.

18. A method for aiding in the use of a facility arranged to equip each visitor with a portable information storing unit, comprising:

registering plural visitors as a group in each portable information storing unit so that one member of said group can exchange a message with another of said group through an access terminal for said portable information storing unit provided in said facility, wherein said access terminal located in said recreational facility includes a function of printing data on the surface of said portable information storing unit so that the visiting history of a certain visitor may be printed on the surface of said portable information storing unit when said visitor enters into one of the unit facilities provided in the facility.

19. A method for aiding in the use of a facility arranged to equip each visitor with a portable information storing unit, comprising:

allowing said visitor to specify a condition of unit facilities located in said facility on an access terminal for said portable information storing units provided in said facility; and enabling said access terminal to display said unit facilities for meeting said specified condition, wherein said portable information storing unit serves as a ticket for unit facilities located in said facility and electronic money as a substitute for cash, and wherein said access terminal located in said recreational facility includes a function of printing data on a surface of a portable information storing unit so that the visiting history of a certain visitor may be printed on the surface of said portable information storing unit when said visitor enters into one of said unit facilities provided in said facility.

* * * * *